(12) United States Patent
Burcham et al.

(10) Patent No.: US 8,002,982 B2
(45) Date of Patent: Aug. 23, 2011

(54) DEFLECTOR FOR A WATER/WASTEWATER FILTRATION TANK

(75) Inventors: Brian K. Burcham, Decatur, IL (US); Timothy D. Wallis, Warrensburg, IL (US); Donald L. Tate, Decatur, IL (US)

(73) Assignee: All Service Contracting Corporation, Decatur, IL (US)

( * ) Notice: Subject to any disclaimer, the term of this patent is extended or adjusted under 35 U.S.C. 154(b) by 1282 days.

(21) Appl. No.: 11/611,977

(22) Filed: Dec. 18, 2006

(65) Prior Publication Data
US 2007/0151934 A1 Jul. 5, 2007

Related U.S. Application Data

(60) Provisional application No. 60/751,691, filed on Dec. 19, 2005.

(51) Int. Cl.
*B01D 24/02* (2006.01)
*B01D 24/22* (2006.01)

(52) U.S. Cl. ......... 210/247; 210/285; 210/456; 210/320

(58) Field of Classification Search .................. None
See application file for complete search history.

(56) References Cited

U.S. PATENT DOCUMENTS

| | | | | |
|---|---|---|---|---|
| 390,512 A * | 10/1888 | Oliphant | ............ | 210/277 |
| 611,691 A * | 10/1898 | Langdon et al. | ............ | 210/323.2 |
| 631,143 A * | 8/1899 | Abraham | ............ | 210/285 |
| 661,189 A * | 11/1900 | Olsen et al. | ............ | 210/266 |
| 661,316 A * | 11/1900 | Maignen | ............ | 210/266 |
| 921,115 A * | 5/1909 | Jewell | ............ | 210/285 |
| 1,090,283 A * | 3/1914 | Crandall | ............ | 210/286 |
| 1,130,382 A * | 3/1915 | Deacon et al. | ............ | 210/189 |
| 1,861,295 A * | 5/1932 | Bramwell | ............ | 210/189 |
| 2,027,400 A * | 1/1936 | Pennebaker | ............ | 210/266 |
| 3,523,762 A * | 8/1970 | Broughton | ............ | 422/638 |
| 4,340,478 A * | 7/1982 | Stannard et al. | ............ | 210/286 |
| 4,378,292 A * | 3/1983 | Haase | ............ | 210/266 |
| 4,412,923 A * | 11/1983 | Capitani et al. | ............ | 210/661 |
| 5,176,827 A | 1/1993 | Walter | | |
| 5,207,905 A | 5/1993 | O'Brien et al. | | |
| 5,673,481 A | 10/1997 | Roberts et al. | | |
| 6,027,645 A | 2/2000 | Biskner et al. | | |
| 6,048,132 A * | 4/2000 | Kupke et al. | ............ | 405/43 |
| 6,149,803 A * | 11/2000 | DiLoreto et al. | ............ | 210/164 |
| 6,190,568 B1 | 2/2001 | Hunkele | | |
| 6,531,059 B1 * | 3/2003 | Morris et al. | ............ | 210/164 |
| 6,615,469 B1 | 9/2003 | Burcham | | |
| 6,733,670 B2 * | 5/2004 | Kupke | ............ | 210/271 |
| 7,112,274 B1 * | 9/2006 | Sanguinetti | ............ | 210/163 |
| 7,128,832 B2 * | 10/2006 | Wade | ............ | 210/155 |
| 2005/0082212 A1 * | 4/2005 | Wade | ............ | 210/170 |
| 2005/0246967 A1 * | 11/2005 | Esmond et al. | ............ | 52/16 |
| 2007/0151934 A1 * | 7/2007 | Burcham et al. | ............ | 210/807 |

* cited by examiner

Primary Examiner — Robert James Popovics
(74) Attorney, Agent, or Firm — Barnes & Thornburg LLP

(57) ABSTRACT

A water/wastewater filtration tank includes a fluid deflector coupled to the inner surface of the water/wastewater filtration tank to divert fluid traveling along the inner surface of the tank into filter media within the tank. The fluid deflector includes a back plate coupled to a tank wall and a flange extending outwardly from the back plate.

13 Claims, 11 Drawing Sheets

DEFLECTOR FOR A WATER/WASTEWATER FILTRATION TANK

This application claims priority to U.S. Provisional Patent Application Ser. No. 60/751,691, filed Dec. 19, 2005 entitled DEFLECTOR FOR FLUID FILTRTATION SYSTEM, the entirely of which is hereby incorporated by reference.

TECHNICAL FIELD

The present disclosure relates to water and/or water/wastewater treatment facilities having a fluid filtration system, and more particularly to deflectors for diverting the flow of fluid through the filtration system.

BACKGROUND

Many water/wastewater treatment facilities include fluid filtration systems such as pressure vessel filtration systems and/or gravity-type filtration systems to treat water or wastewater. For example, wastewater treatment facilities operate to treat wastewater from industrial, municipal, recreational, and construction applications, sites, and/or entities, for example. Such wastewater may come from sewage, residential use (i.e., shower, dishwasher, washing machine, etc.), storm drains, and the like. Water treatment facilities treat and process water for delivery to consumers. Such water treatment facilities treat ground water, reservoir water, river water, lake water, and/or underground water for distribution as consumable water (e.g., potable) to residents and businesses within various cities and towns. Municipalities oftentimes own and operate such large-scale water treatment facilities.

The filtration systems of such water/waste water treatment facilities include a tank having one or more types of fluid media therein such as sand, anthracite, and/or gravel. Unclarified water enters the tank and flows downwardly through one or more filtering media which filter out unwanted substances. The filtered water then flows through an under drain system and out the tank.

During filtration, water may also flow down along the inner surface of the tank walls as well as along the outer surface of a pipe or any other protrusions within the tank. When it flows in such a manner, the water may not travel through the filter media and may effectively bypass the filtering media altogether. This is often referred to as "short circuiting." Short-circuiting of water occurs when the liquid travels through the tank without being advanced through adequate amounts of the filter media.

SUMMARY

According to one aspect of the present disclosure, a water/wastewater treatment system includes a water/wastewater filtration tank. Filter media is contained within the water/wastewater filtration tank. A fluid deflector has a back plate coupled to an inner surface of the water/wastewater filtration tank, and a flange extending outwardly from the back plate.

Illustratively, the flange extends downwardly away from the back plate at an acute angle. The acute angle may be approximately 22°.

In some embodiments, the back plate may be curved to such that the back plate is configured to be coupled to a curved surface.

Illustratively, the fluid deflector may be secured to the tank by use of a fastener, adhesive, or weld.

In still other embodiments, the flange may include a bottom flange portion and an upper flange portion spaced-apart from and generally parallel to the bottom flange portion to define a passageway therebetween. Such a flange may further include an end wall coupled to and extending between the upper flange portion and the lower flange portion. Illustratively, the lower flange portion may be coupled to the back plate and the upper flange portion may be spaced-apart from the back plate.

Illustratively, the flange may include an aperture formed therethrough to receive a pipe positioned within the tank.

According to another aspect of the present disclosure, a water/wastewater treatment apparatus includes a water/wastewater filtration tank having an inner surface. Filter media is contained within the water/wastewater filtration tank. A flange is secured to the inner surface of the water/wastewater tank. The flange extends outwardly and downwardly from the inner surface of the water/wastewater tank.

According to still another aspect of the present disclosure, a method of retrofitting a water/wastewater tank includes coupling a fluid deflector to an inner surface of the water/wastewater tank. The fluid deflector has a flange which extends outwardly from the inner surface of the water/wastewater tank such that a flow of fluid advancing down the inner surface of the water/wastewater tank is directed inwardly toward the center of the tank.

According to yet another aspect of the present disclosure, a method of advancing fluid through a water/wastewater filtration tank includes advancing a flow of fluid down the inner surface of the water/wastewater tank and into contact with a flange. The flow of fluid is diverted inwardly toward the center of the tank by the flange.

The above and other features of the present disclosure will become apparent to those skilled in the art upon consideration of the following detailed description and accompanying drawings of illustrative embodiments exemplifying the best mode of carrying out the disclosure as presently perceived.

BRIEF DESCRIPTION OF THE DRAWINGS

The detailed description particularly refers to the following figures, in which.

DETAILED DESCRIPTION OF THE DRAWINGS

Figure 1:
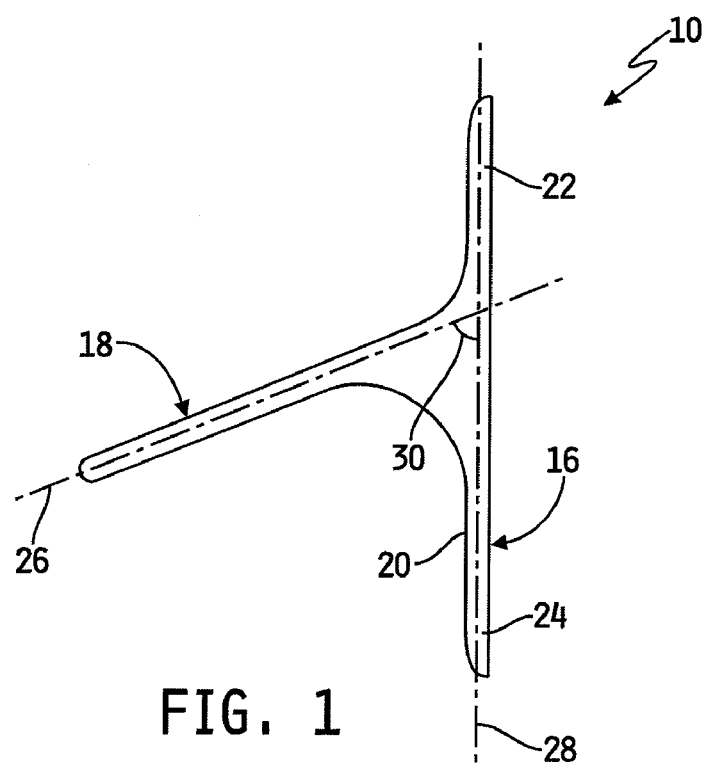
FIG. 1 is a side view of a fluid deflector of a water/wastewater filtration tank.
Figure 2:
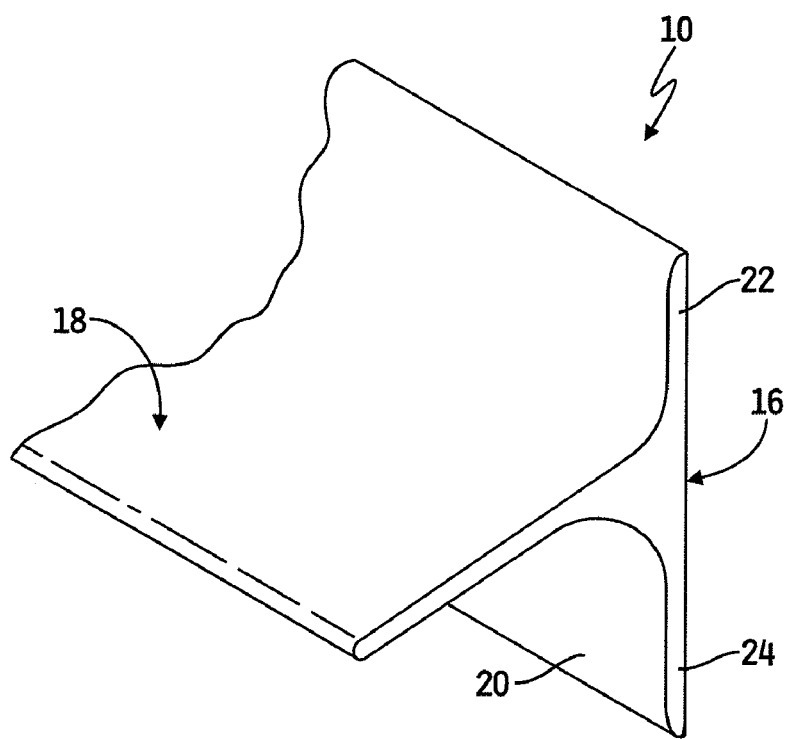
FIG. 2 is a fragmentary perspective view of the fluid deflector of FIG. 1.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Looking now to FIGS. 1-19, there is shown various embodiments of fluid filtration systems for use in a water/wastewater treatment facility. The fluid filtration systems may be included in a wastewater treatment facility to filter wastewater for industrial, municipal, recreational, and construction applications, sites, and/or entities, for example. Such a facility treats wastewater which comes from sewage, residential use (e.g., shower, dishwasher, washing machine, etc.), storm drains, and the like so that the treated wastewater may be reused or safely released into the environment. A water treatment facility, on the other hand, treats and processes water for delivery to consumers. Such a facility treats ground water, reservoir water, river water, lake water, and/or underground water for distribution as consumable (e.g., potable) water to residents and businesses within various cities and towns. For example, municipalities oftentimes own and operate such large-scale water treatment facilities. As used herein, the term "water/wastewater filtration tank" refers to a tank, vessel, or basin used in the operation of such large-scale water or wastewater treatment facilities to treat water and/or wastewater.

Figure 5:
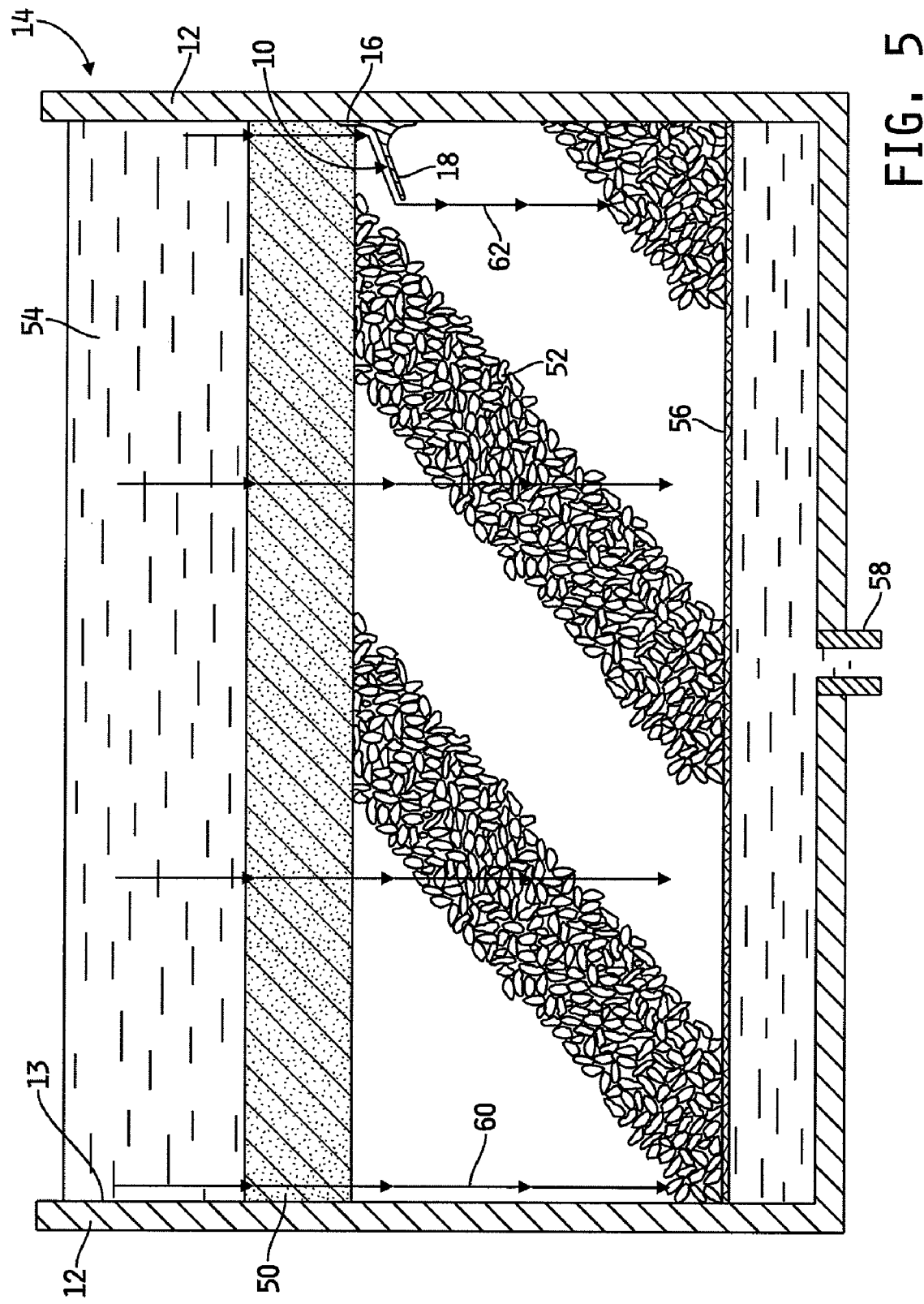
FIG. 5 is a sectional view of a water/wastewater filtration tank.

As shown in FIG. 5, a gravity-type multimedia water/wastewater filtration system may include a water/wastewater filtration tank 14, with one or more filtration media 50, 52 contained within the tank 14, and an under drain system 56. A fluid deflector 10 is coupled to an inner tank wall 12 of the fluid filtration tank 14. As is discussed in greater detail below, the fluid deflector 10 diverts a flow of fluid traveling along the wall 12 into the filter media 50 or 52 within the fluid filtration tank 14. Illustratively, the fluid deflector 10 includes a back plate 16 for attachment to the wall 12 of the tank 14 and a flange 18. The flange 18 extends downwardly and away from a front surface 20 of the back plate 16. The back plate 16 of the fluid deflector 10 includes an upper portion 22 positioned generally above the flange 18 and a lower portion 24 positioned generally below the flange 18. Illustratively, the back plate 16 may include only one of the upper portion 22 and the lower portion 24.

As shown in FIG. 1, a plane or imaginary line 26 through the flange 18 intersects a plane 28 through the back plate 16 to define an acute angle 30 therebetween. Illustratively, the acute angle 30 is approximately 22°; however, it is within the scope of this disclosure for the back plate 16 and the flange 18 to define any suitable angle therebetween such that fluid flow is directed away from the wall 12 of the tank 14. For example, flange and the back plate may be generally perpendicular to each other such that an angle of intersection between the back plate and the flange is approximately 90°.

Figure 3:
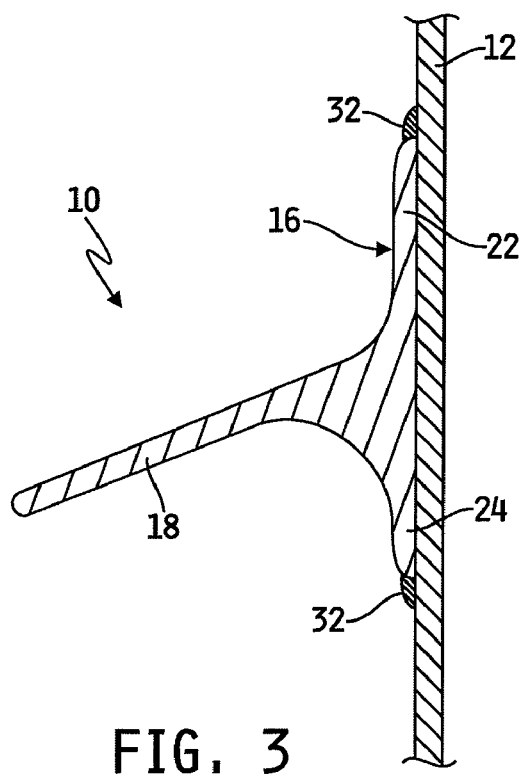
FIG. 3 is a sectional view showing the fluid deflector of FIGS. 1 and 2 welded to a tank wall.

The fluid deflector 10 may be coupled to the wall 12 of the fluid filtration tank 14 in a variety of ways. Looking to FIGS. 3 and 4, for example, the fluid deflector 10 may be welded (see FIG. 3) or anchored (see FIG. 4) to the wall 12 of the fluid filtration tank 14. As shown in FIG. 3, the wall 12 of the fluid filtration tank 14 is made from a metal such as steel, for example. Accordingly, the back plate 16 of the fluid deflector 10 is made from metal as well and is welded to the steel wall 12 with welds 32.

Figure 4:
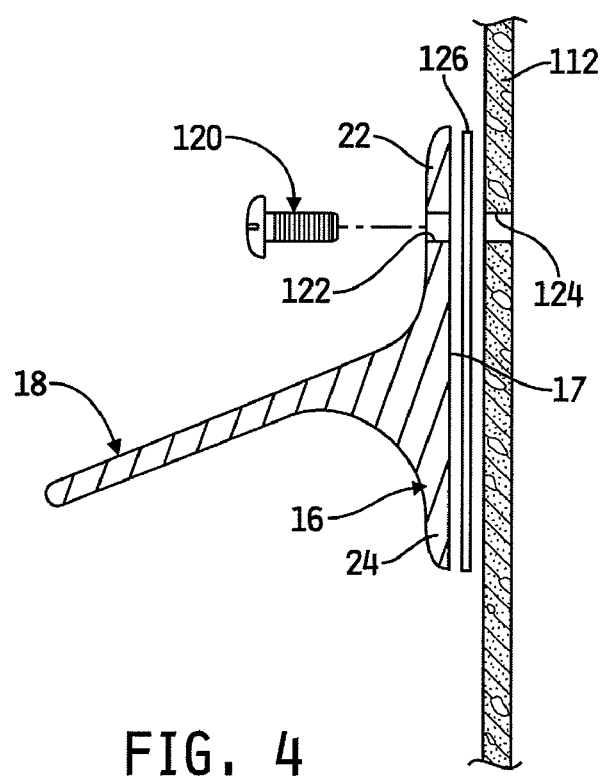
FIG. 4 is a sectional view showing the fluid deflector of FIGS. 1-3 fastened to a tank wall using an anchor.

Looking to FIG. 4, a wall 112 of the fluid filtration tank 14 is made from a masonry material such as concrete, for example. Accordingly, the back plate 16 of the fluid deflector 10 is anchored to the wall 112 by an anchor 120. The anchor 120 may be a screw, nail, rivet, bolt, or other suitable fastener. Illustratively, the upper portion 22 of the back plate 16 includes an aperture 122 formed therethrough to receive the anchor 120. An accompanying bore 124 may be drilled into the wall 112 in order to receive the anchor 120 therein. Illustratively, while the anchor 120 is received through the aperture 122 formed in the upper portion 22 of the back plate 16, it is within the scope of this disclosure to provide an aperture through the lower portion 24 of the back plate 16 to receive an additional anchor 120 therethrough. Further illustratively, a sealant 126 may be provided between a back surface 17 of the back plate 16 and the wall 112 in order to prevent moisture or fluid from collecting or flowing between the back plate 16 and the wall 112. The sealant 17 may be a silicone-based sealant, for example. While a single anchor 120 is shown in FIG. 4, it is within the scope of this disclosure to use any number of anchors 120 to couple the deflector 10 to the wall 112. Further, while the deflector 10 shown in FIG. 3 is welded to the steel tank wall 12, it is within the scope of this disclosure to couple the deflector 10 to a steel tank wall 12 using anchors 120. It is also within the scope of this disclosure to include other suitable means of coupling the deflectors disclosed herein to a wall or other vertical surface within the fluid filtration tank. For example, the deflectors described herein may illustratively be coupled to the tank walls and/or other vertical surfaces by the use of clamps, wedge anchors, and/or various adhesives such as epoxies.

Looking again to FIG. 5, a typical fluid filtration tank 14 may contain two different grades of filter media 50, 52, such as sand and gravel, for example, through which the unclarified liquid 54 travels before reaching the under drain system 56 at the bottom of the tank 14 and draining through the exit pipe 58. As shown in FIG. 5, un-diverted fluid flow 60 of some of the unclarified liquid 54 may travel along the inner surface 13 of the wall 12 of the fluid filtration tank 14. Unclarified liquid 54 which travels along this fluid flow path 60 may bypass the filter media 50, 52 and may reach the under drain system 56 and exit pipe 58 without having been sufficiently filtered. Accordingly, this "short circuiting" fluid flow path 60 of the unclarified liquid 54 along the walls 12 of the fluid filtration tank 14 may result in unfiltered or unclarified liquid 54 exiting through the exit pipe 58.

Figure 6:
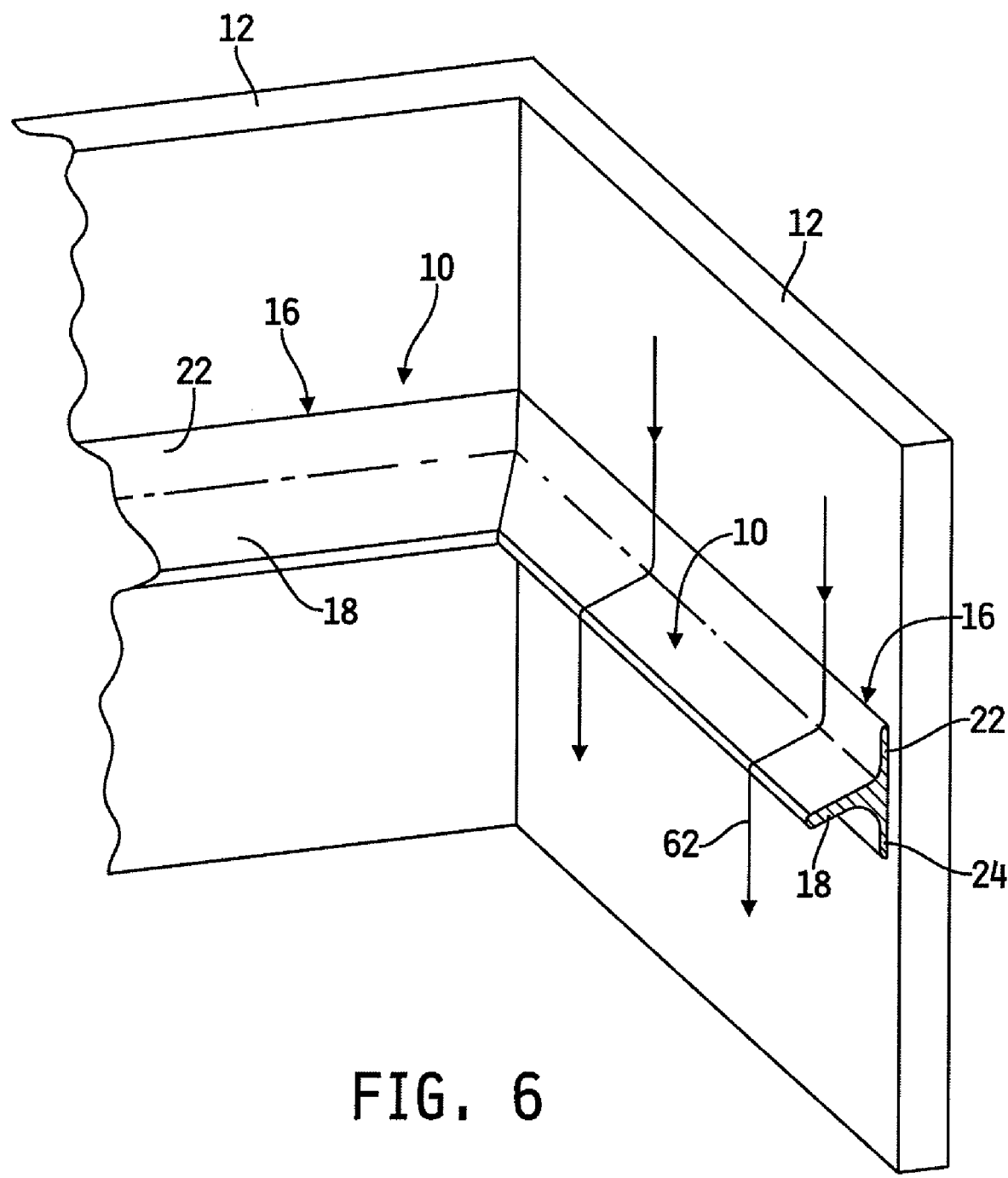
FIG. 6 is a fragmentary perspective view of the tank of FIG. 5.

The fluid deflector 10 diverts or redirects the flow of unclarified liquid 54 traveling along the inner surface 13 of the wall 12 of the fluid filtration tank 14 into the filter media 50 or 52 to create a diverted fluid flow path 62, as shown in FIGS. 5 and 6. Looking to FIG. 5, the deflector 10 is positioned to divert the flow of unclarified liquid 54 into the second filter media 52. However, it is within the scope of this disclosure to position the deflector 10 at any suitable location along the length of the wall 12. For example, the deflector 10 may be positioned at a location within the unclarified liquid 54, within the first filter media 50, or within the second filter media 52. Illustratively, the deflector 10 may extend around the entire perimeter of the fluid filtration tank 14 or may extend along one or more portions of the fluid filtration tank 14. In other words, the deflector 10 may form a ring around the perimeter of the inner surface 13 of the fluid filtration tank 14 or may be segmented into one or more sections and coupled to the wall 12 at one or more locations. As such, the deflector 10 may be configured to be any suitable length to provide small or large deflector segments for use in fluid filtration tanks of varying sizes.

Figure 7:
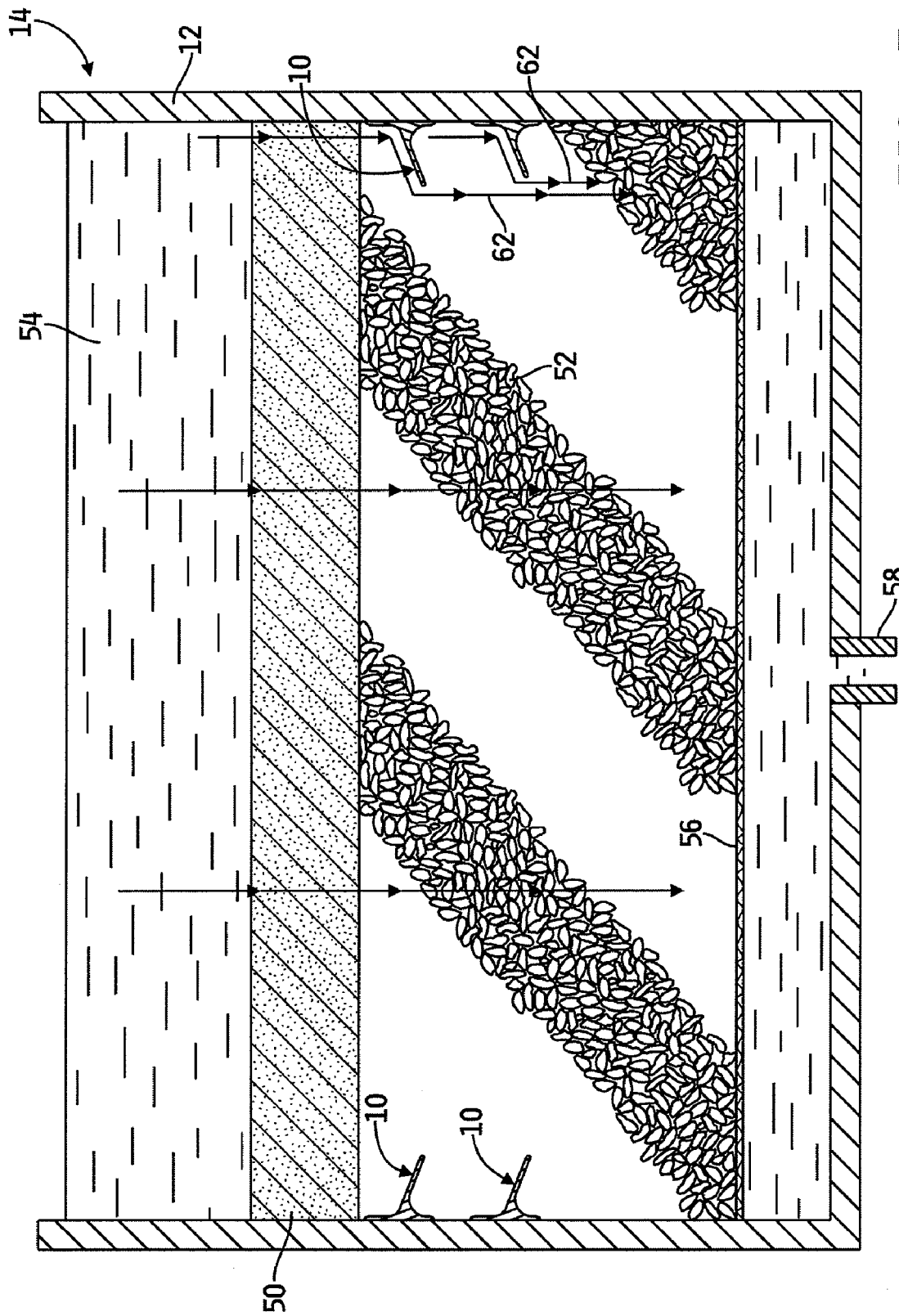
FIG. 7 is a sectional view similar to FIG. 5, but showing a tank equipped with two fluid deflectors.

Looking now to FIG. 7, it is also within the scope of this disclosure to position more than one fluid deflector 10 along the length of the wall 12 of the fluid filtration tank 14. In other words, the deflectors 10 may be positioned at any elevation within the fluid filtration tank 14. In particular, any number of fluid deflectors 10 may be positioned along the length of the wall 12 of the fluid filtration tank 14 such that one ore more fluid deflectors 10 may be positioned at a location within the unclarified liquid 54, the first filter media 50, and/or the second filter media 52.

Figure 8:
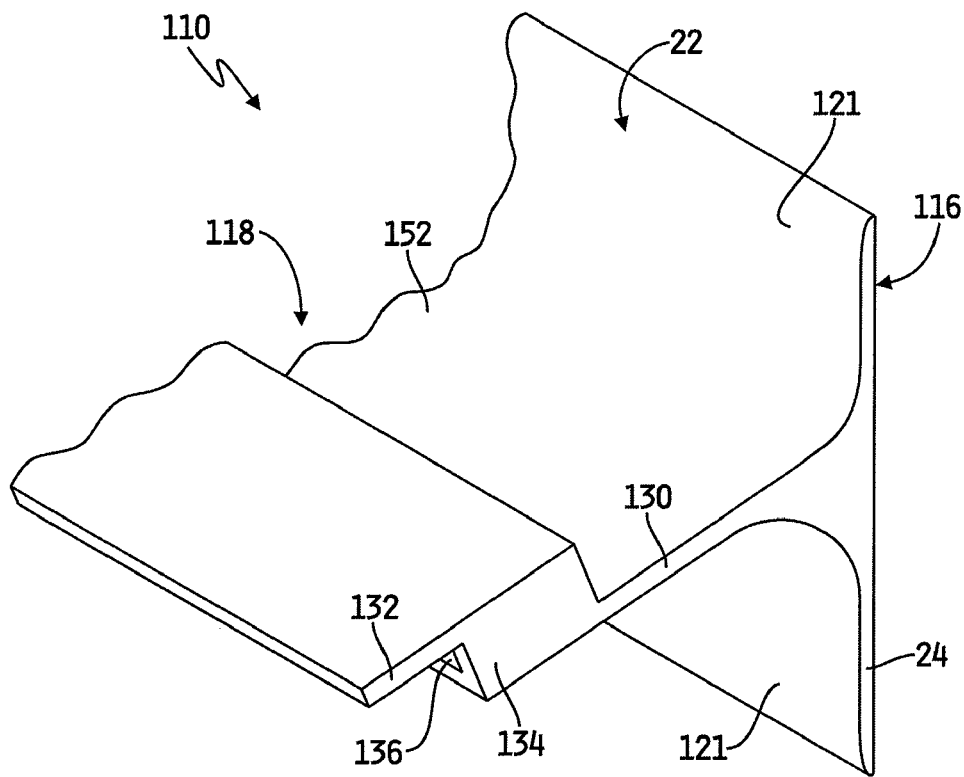
FIG. 8 is a fragmentary perspective view of another fluid deflector.
Figure 9:
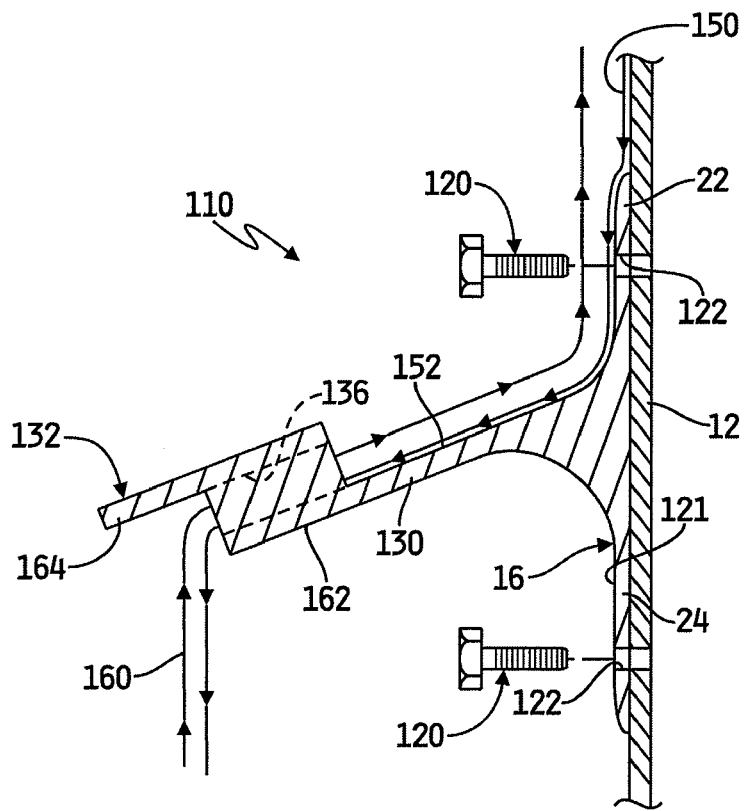
FIG. 9 is a side view of the fluid deflector of FIG. 8 showing fluid flow for both a filtering cycle and a backwash cycle.

Looking now to FIGS. 8 and 9, an alternative fluid deflector 110 includes a back plate 116 and a flange 118 extending downwardly and away from a front surface 121 of the back plate 116. Illustratively, the flange 118 includes a first or bottom wall portion 130 coupled to the front surface 121 of the back plate 116. Similar to the fluid deflector 10, a plane through the first portion 130 of the fluid deflector 110 intersects a plane through the back plate 116 to define an acute angle of approximately 22°. The flange 118 further includes a second, or top, wall portion 132 positioned above and spaced-apart from the bottom wall portion 130. The top and bottom wall portions 130, 132 are generally parallel to each other. A pair of end walls 134 extend between and are coupled to the top and bottom wall portions 130, 132 of the flange 118 to define a passageway 136 between the top and bottom wall portions 130, 132. Illustratively, the flange 118 includes an end wall 134 at each end of the fluid deflector 110. However, additional walls may be provided between the top and bottom wall portions 130, 132.

Figure 12:
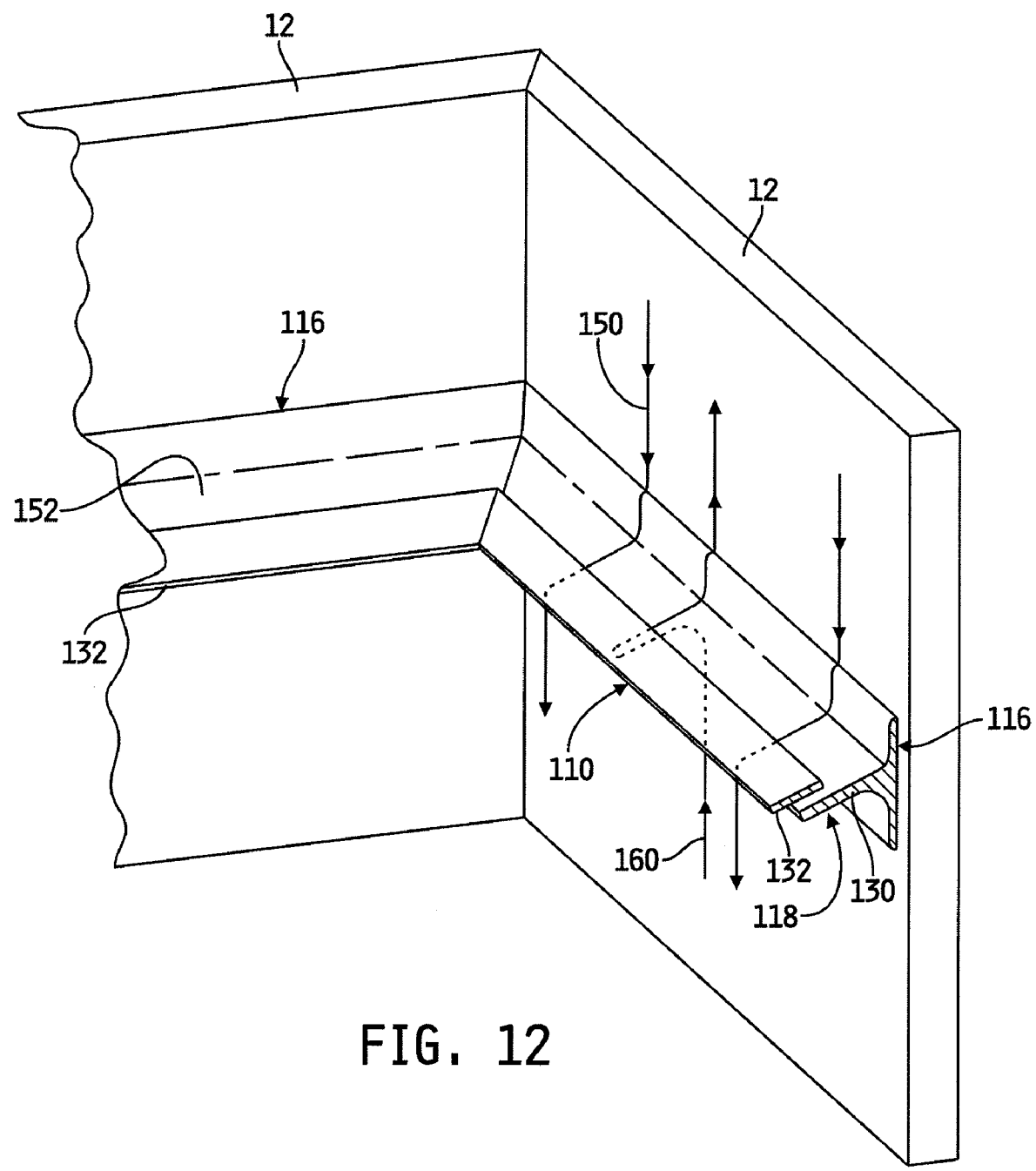
FIG. 12 is a fragmentary perspective view a water/wastewater filtration tank having the fluid deflector of FIGS. 8 and 9 positioned therein.

As shown in FIG. 9, the fluid deflector 110 is illustratively coupled to the wall 12 of the fluid filtration tank 14 by anchors 120. A first anchor 120 is received through a first hole 122 formed in the upper portion 22 of the back plate 116 while a second anchor 120 is received through a second hole 122 formed in the lower portion 24 of the back plate 116. In use, a fluid flow path 150 is created during a filtering cycle when unclarified liquid 54 is gravity driven to flow downwardly through the filter media 50, 52 within the fluid filtration tank 14. As shown in FIGS. 9 and 12, the fluid flow path 150 during the filtering cycle travels downwardly over the front surface 121 of the upper portion 22 of the back plate 116, along an upper surface 152 of the bottom flange portion 130, through the passageway 136 of the flange 118, and into the filter media 50 or 52 at a position spaced-apart from the wall 12.

Alternatively, a backwash cycle involves flushing liquid upwardly from the bottom of the tank 14 through the second filter media 52, and finally through the first filter media 50 in order to flush particles or unwanted substances contained within the filter media 50, 52 and which have accumulated on the deflector 110 through the water/wastewater filtration system. Such flushing of liquid in an upward direction causes the filtering media 50, 52 to fluidize and rub against itself in order to create a cleaning action of the filtering media 50, 52. The upward flow then carries the unwanted substances to waste or another such final destination. Due to shortened backwash cycles, low reverse flows, or untimely backwashes, unwanted substances may build up on the tank walls 12 and or other protrusions or surfaces within the tank 14. This build up of unwanted substances on the walls and or protrusions may move outwardly into the filtering media to cause the filtering media to bind or bond to itself and become fouled and/or plugged.

Illustratively, such binding or bonding of the filtering media may render the media ineffective or less effective at removing and filtering unwanted substances from the liquid. This may, in turn, cause excessive pressure on the under drain system 56. Such excessive pressure may cause the supporting bed of various grades of gravel used in some filtration systems to be rolled or mounded which can lead to channeling of the filtering media. Channeling of the filtering media is caused when the filtering media separates and allows the liquid to flow through the filtering media at a faster rate than originally intended in order to remove all unwanted substances and may also be referred to as short-circuiting.

Accordingly, backwash cycles are performed in order to remove unwanted substances which may have accumulated during a filtering cycle in order to prevent and/or minimize any channeling of the filtering medial. During such a backwash cycle, a backwash fluid flow path 160 is created through the deflector 110, as shown in FIGS. 9 and 12, whereby fluid travels from the bottom of the tank 14, up the wall 12 of the tank 14, over the front surface 121 of the bottom portion 24 of the back plate 116, along a bottom surface 162 of the bottom portion 130 and up through the passageway 136 of the flange 118. Illustratively, an overhang portion 164 of the upper flange portion 132 directs the fluid traveling along the backwash fluid flow path 160 through the passageway 136 and over the top surface 152 of the bottom flange portion 130. Finally, the fluid traveling along the backwash fluid flow path 160 travels upwardly along the front surface 121 of the upper portion 22 of the back plate 116.

While a backwash cycle has been described above with use of the deflector 110, it should be understood that a backwash cycle may be performed while other deflectors disclosed herein are coupled to various surfaces within the filtration tank 14. In use, the reverse fluid flow during a backwashing cycle causes turbulence when the liquid and the filtering media 50, 52 is caused to come into contact with the bottom side of the flange of any of the various deflectors disclosed herein. This turbulence forces the liquid and the filtering media to rub against and scour the tank walls 14 and or other protrusions within the tank 14 while also allowing the collected unwanted substances to wash out with the liquid to waste or its final destination.

Figure 10:
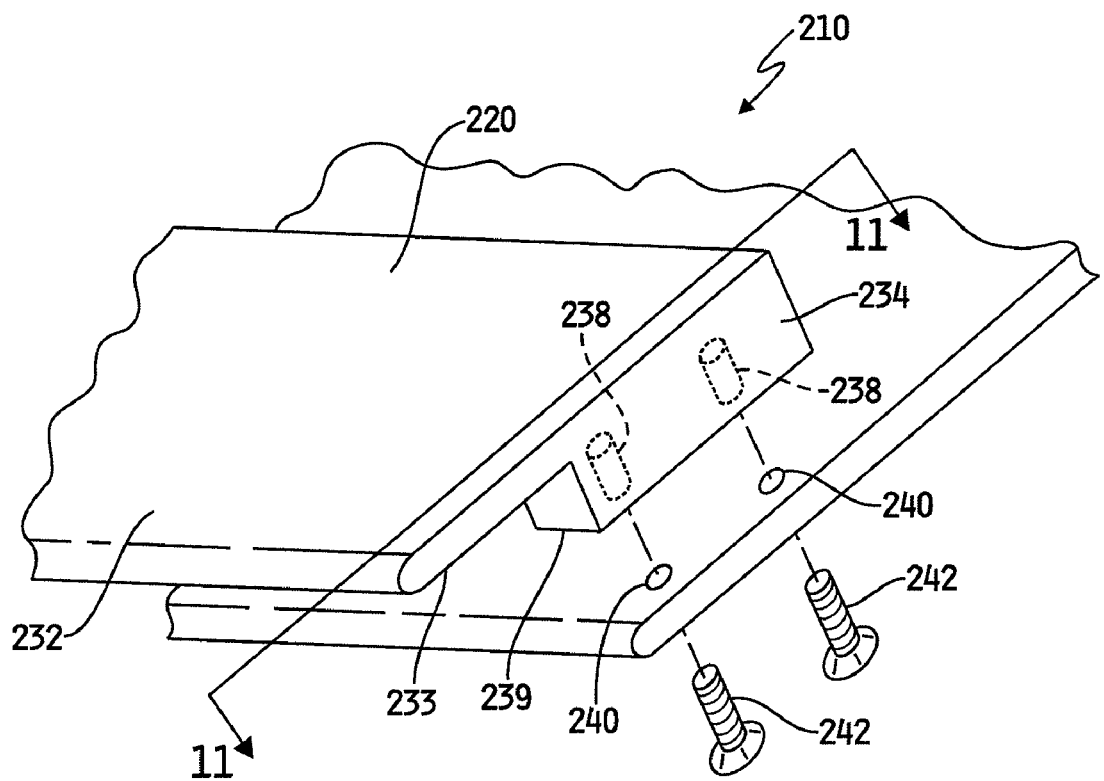
FIG. 10 is a fragmentary perspective view of a modular fluid deflector that is similar to the fluid deflector shown in FIGS. 8 and 9.
Figure 11:
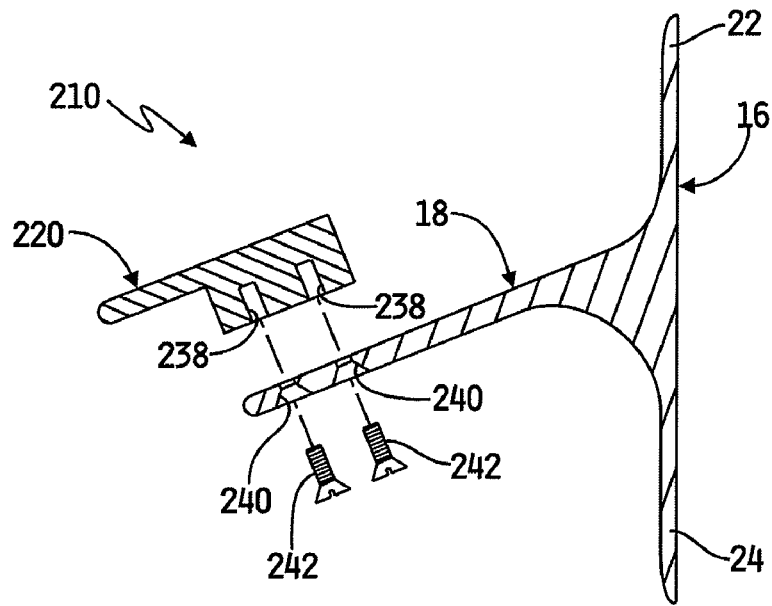
FIG. 11 is a sectional view of the modular fluid deflector of FIG. 10.

While the fluid deflector 110 is shown as a unitary structure, it is within the scope of this disclosure to provide a similar fluid deflector, such as the fluid deflector 210 shown in FIGS. 10 and 11, including separate components which are coupled together. Illustratively, the fluid deflector 210 includes the back plate 16 and flange 18 of the deflector 10 shown in FIGS. 1 and 2. The fluid deflector 210 further includes a flange attachment 220 including an upper wall or upper flange portion 232 and end walls 234 extending downwardly from a bottom surface 233 of the upper flange portion 232. Illustratively, two bores 238 are formed into a bottom surface 239 of the end walls 234 and corresponding apertures 240 are formed through the flange 18. A fastener 242 is received through each aperture 240 and into the respective bore 238 formed in the flange attachment 220 in order to couple the flange attachment 220 and the flange 18 together. Once the flange attachment 220 and the flange 18 are coupled together, the flange 18 effectively operates as the lower flange portion 130 discussed above in regards to the unitary deflector 110 shown in FIGS. 8 and 9 while the upper flange portion 232 of the flange attachment 220 operates as the upper flange portion 132 of the fluid deflector 110. Once assembled, the fluid deflector 210 operates in the same manner as described above in regards to the fluid deflector 110.

Figure 13:
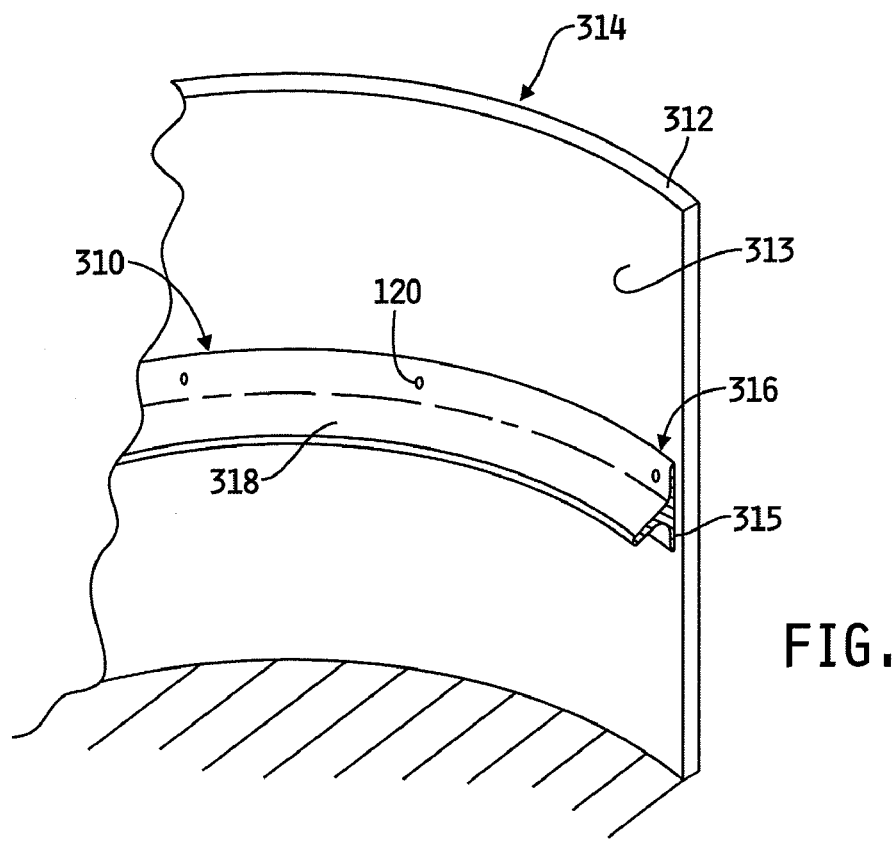
FIG. 13 is a fragmentary perspective view a cylindrically-shaped water/wastewater filtration tank.

Looking now to FIG. 13, a curved fluid deflector 310 is provided to be coupled to a curved wall 312 of a fluid filtration tank 314. As shown in FIG. 13, the back plate 316 of the deflector 310 is curved to accommodate the curve of the wall 312 of the fluid filtration tank 314 such that a back surface 315 of the back plate 316 is generally flush with the inner surface 313 of the wall 312. Illustratively, the fluid deflector 310 is coupled to the curved wall 312 of the tank 314 through the use of anchors 120; however, as discussed above, the fluid deflector may be coupled to the curved wall 312 of the tank 314 by any suitable means. While the illustrative curved tank 314 and coordinating curved deflector 310 are shown in FIG. 13, it is within the scope of this disclosure to provide curved deflectors for use with curved tanks of varying sizes and curvatures. In other words, it is within the scope of this disclosure to provide curved deflectors defining any curve suitable to fit any curved tank wall. Further, it is within the scope of this disclosure to provide curved deflectors for use with curved tanks which may be oval or generally non-circular in shape such that the curvature of the wall may change around the inner perimeter of the tank. The fluid deflectors of the present disclosure may be configured to accommodate the shape of any fluid filtration tank.

Figure 14:
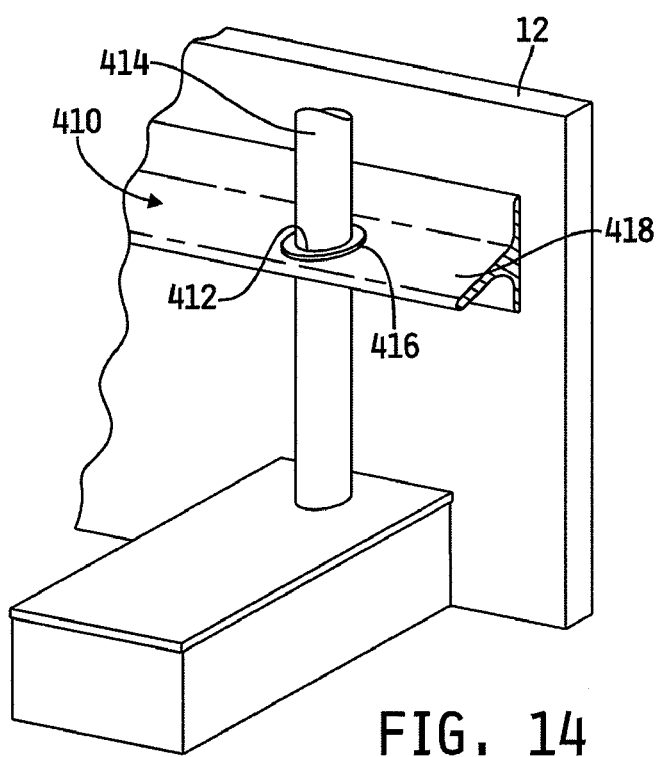
FIG. 14 is a fragmentary perspective view of a water/wastewater filtration tank having a pipe within the tank which intersects the fluid deflector.

Looking now to FIG. 14, another fluid deflector 410 is provided. The fluid deflector 410 is similar to other fluid deflectors discussed above. As such, like reference numerals have been used to denote like components. Illustratively, the fluid deflector 410 includes an aperture 412 formed through the flange 418 of the deflector 410 in order to receive a vertically-extending pipe 414 therethrough. Oftentimes, a fluid filtration tank may include one or more pipes or other protrusions positioned at various locations throughout the tank. Such pipes 414 may be located near one or more of the outer walls 12 of the tank 14. The aperture 412 through the flange 418 accommodates the pipe 414. During installation, the top or open end of the pipe 414 may be slid through the aperture 412 of the deflector 410 and the deflector 410 may be positioned as desired at any elevation along the tank wall 12. Illustratively, a sealant 416 is be provided between the pipe 414 and the flange 418 in order to ensure the pipe 414 and the flange 418 are coupled together in a watertight fashion. The sealant 416 may be made from a silicone-based material, for example. Alternatively, a gasket (not shown) may be provided between the pipe 414 and the flange 418 to create the watertight seal. In use, the flange 418 of the deflector 410 operates not only to divert fluid traveling along the tank wall 12 into the filter media 50, 52, but also operates to divert fluid traveling along the pipe 414 into the filter media 50, 52 as well.

Looking now to FIGS. 15-19, various fluid deflectors are provided for use with pipes of different shapes and sizes. As noted in FIG. 14 above, fluid filtration tanks often include one or more pipes or other protrusions located therein. The pipe 414 shown in FIG. 14 is positioned near the tank wall 12 and is accommodated through the use of the fluid deflector 410. However, fluid filtration tanks may include any number of pipes positioned at any location within the tank walls 12, such as those shown in FIG. 16, for example. Fluid flowing downwardly through the fluid filtration tank may "short circuit" not only along the inner surface 13 of the tank walls 12, but also along the outer surface 413 of these pipes 414. In other words, a fluid flow path may be created along the outer surface 413 of a pipe 414 located within the fluid filtration tank 14 which prevents the unclarified fluid 54 traveling along this path from being filtered through the filter media 50, 52. Such unclarified fluid may reach the under drain system and exit the tank 12 of the fluid filtration tank without having been sufficiently filtered by the filter media 50, 52. Accordingly, the fluid deflectors shown in FIGS. 15-19 may be coupled to pipes located within the fluid filtration tank 14 in order to deflect or divert the fluid traveling along the outer surface 413 of the pipe 414 into the first or second fluid filtration media 50, 52.

Figure 15:
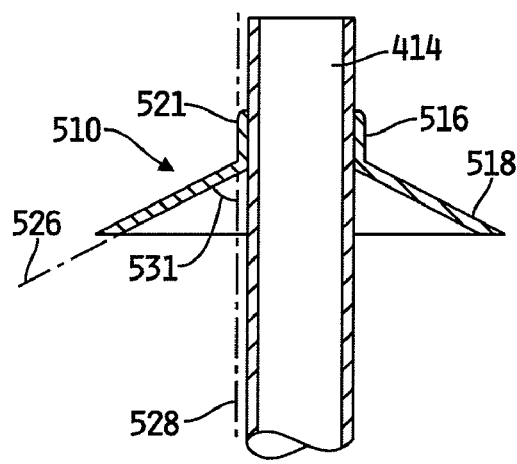
FIG. 15 is a sectional view of a fluid deflector coupled to a pipe.
Figure 17:
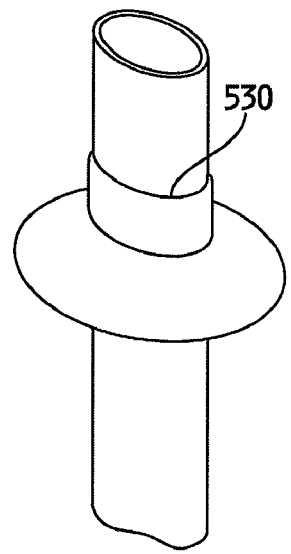
FIGS. 17-19 are fragmentary perspective views of fluid deflectors coupled to pipes.
Figure 16:
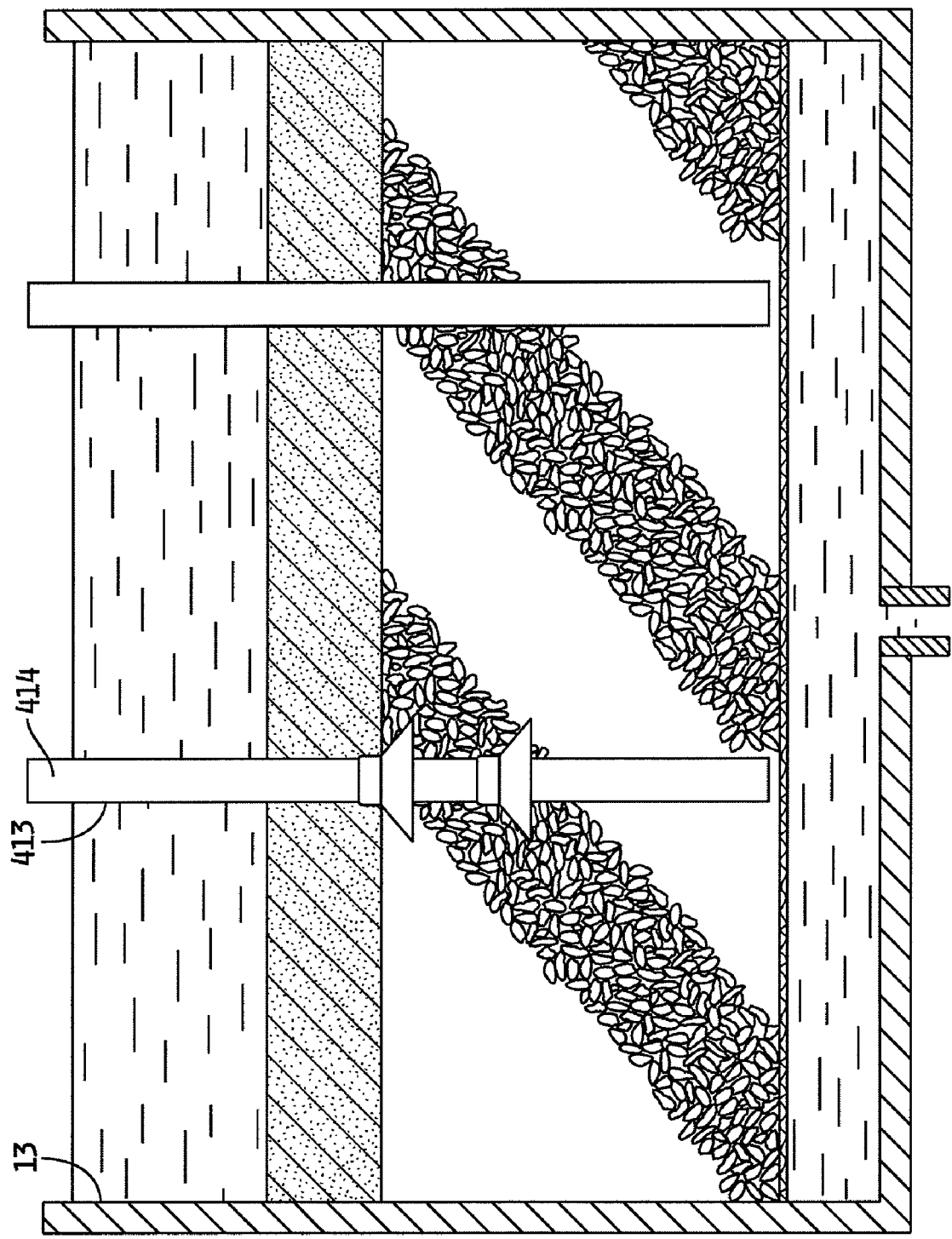
FIG. 16 is a sectional view of a water/wastewater filtration tank showing multiple fluid deflectors coupled to a pipe within the tank.

Looking to FIGS. 15-17, a fluid deflector 510 for use with a pipe 414 having a generally circular or curved cross-sectional shape is provided. The fluid deflector 510 includes a back plate 516 and a flange 518 extending outwardly and downwardly from a front surface 521 of the back plate 516. In order to accommodate the generally circular pipe 414, the back plate 516 is curved to define an aperture 530 configured to receive the pipe 414 therethrough. In use, the deflector 510 may be slid over the top end of the pipe 414 and positioned at any suitable location along the length of the pipe. Illustratively, when viewed in cross-section, as shown in FIG. 15, an acute angle of intersection 531 between an imaginary line 528 running generally along the length of the pipe and/or along a vertical length of the outer surface 521 of the back plate 516 and an imaginary line 526 running along the upper surface of the flange 518 is approximately 22°. However, the deflector 510 may be configured to define other suitable acute angles of intersection therebetween.

As shown in FIG. 16, more than one fluid deflector 510 may be coupled to a single pipe 414 and may be spaced-apart from each other along the length of the pipe 414 to be positioned partially or wholly within the unclarified liquid 54, the first filter media 50, or the second filter media 52. The fluid deflector 510 may further include a sealant or gasket (not shown) between the pipe 414 and the back plate 518 in order to create a generally watertight seal to prevent water from seeping between the pipe 414 and the back plate 516.

Figure 18:
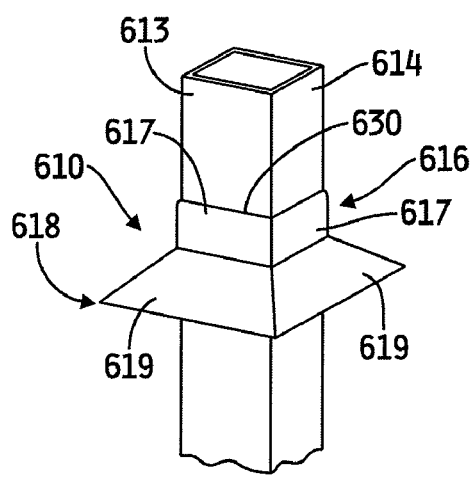

Looking now to FIG. 18, a fluid deflector 610 for a generally square or rectangular pipe 614 is provided. The fluid deflector 610 is similar to the fluid deflector 510 and includes a back plate 616 having four sections 617 each adjacent to an outer surface 613 of the pipe 614. The fluid deflector 610 further includes a flange 618 having four sections 619 each coupled to a respective section 617 of the back plate 616. The flange 618 extends outwardly and downwardly from the back plate 616 such that a plane defined by each flange section 619 intersects a plane defined by each back plate section 617 to create an acute angle of intersection of approximately 22°. In order to accommodate the generally square of rectangular pipe 614, the back plate 616 defines an aperture 630 configured to receive the pipe 414 therethrough.

Illustratively, the fluid deflectors 510, 610 may be configured for use with pipes of varying size and shape. For example, the fluid deflectors 510, 610, may be configured for use with a pipe having a circular, oval, triangular, square, rectangular, hexagonal, or other cross-sectional shape such that the opening or aperture 530, 630 defined by the back plate 516, 616 of the deflector 510, 610 is similarly shaped and configured to receive the particular pipe therethrough.

Figure 19:
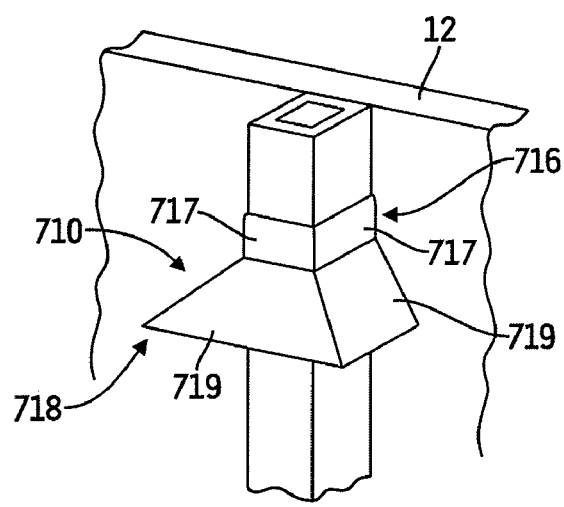

Looking to FIG. 19, yet another fluid deflector 710 for a pipe within a fluid filtration tank is provided. Illustratively, the pipe 614 shown in FIG. 19 includes a wall adjacent to and generally flush with the tank wall 12 of the fluid filtration tank 14. Accordingly, the fluid deflector 710 includes a back plate 716 having three sections 717 each coupled to a respective one of the three other side walls of the pipe 614. The fluid deflector 710 further includes a flange 718 having three sections 719 such that each flange section 719 is coupled to and extends outwardly and downwardly from a respective one of the three sections 717 of the back plate 716.

It should be understood that the deflectors disclosed herein may be made from stainless steel or other metals, concrete, plastic, or synthetic rubbers such as ethylene propylene dien (EPDM), for example. Of course, it is within the scope of this disclosure to include deflectors made from other suitable materials. The deflectors disclosed herein may be coated with an anti-corrosive coating. Furthermore, while the deflectors are herein disclosed as being coupled to the tank wall and/or the pipe wall of fluid filtration tanks, it is within the scope of this disclosure to provide a deflector configured to be coupled to any object which penetrates or is positioned within either the first or second filter media 50, 52. For example, a deflector may be coupled to any generally vertical surface present within the fluid filtration tank.

The herein-described deflectors operate to reduce or eliminate the short-circuit flow of fluid along the tank walls and/or the outer surface of pipes and other protrusions. Indeed, the wall and pipe deflectors shown and described herein operate to divert or deflect such fluid away from the wall and/or pipe and into the filter media prior to arrival at its final destination. The wall and pipe deflectors cause the liquid to be forced into the filtering media at one or several locations and or elevations to enhance the filtering process.

Although the wall and pipe deflectors are shown as separate components which are coupled to the respective pipes and/or walls of the tank, it is within the scope of this disclosure to include wall and pipe deflectors which are unitary structures with the wall and/or pipe to which they are attached. For example, a tank wall may be molded or otherwise formed to include such wall deflector(s) as those described herein to form a unitary component. Further, a pipe or other protrusion may be molded or otherwise formed to include such pipe deflector(s) as those described herein to produce a unitary component.

While the concepts of the present disclosure have been illustrated and described in detail in the drawings and foregoing description, such an illustration and description is to be considered as exemplary and not restrictive in character, it being understood that only the illustrative embodiments have been shown and described and that all changes and modifications that come within the spirit of the disclosure are desired to be protected.

There are a plurality of advantages of the present disclosure arising from the various features of the apparatus and methods described herein. It will be noted that alternative embodiments of the apparatus and methods of the present disclosure may not include all of the features described yet still benefit from at least some of the advantages of such features. Those of ordinary skill in the art may readily devise their own implementations of an apparatus and method that incorporate one or more of the features of the present disclosure and fall within the spirit and scope of the present disclosure.

The invention claimed is:

1. A water/wastewater treatment apparatus comprising:
   a water/wastewater filtration tank,
   a pipe positioned within the water/wastewater filtration tank,
   filter media contained within the water/wastewater filtration tank,
   a first fluid deflector having (i) a back plate coupled to an inner surface of the water/wastewater filtration tank, (ii) a flange extending outwardly from the back plate, and (iii) the back plate includes an upper portion positioned generally above the flange and a lower portion positioned generally below the flange, and
   a second fluid deflector having (i) a back plate coupled to an outer surface of the pipe, and (ii) a flange extending outwardly from the back plate,
   wherein the first fluid deflector is positioned within the filter media.

2. The water/wastewater treatment apparatus of claim 1, wherein the first fluid deflector extends around an inner periphery of the water/wastewater filtration tank.

3. The water/wastewater treatment apparatus of claim 1, wherein the outer wall of the water/wastewater filtration tank is curved and the back plate of the first fluid deflector is curved.

4. The water/wastewater treatment apparatus of claim 1, wherein the flange extends downwardly away from the back plate at an acute angle.

5. The water/wastewater treatment apparatus of claim 1, wherein a portion of the inner surface of the water/wastewater filtration tank defines the back plate.

6. The water/wastewater treatment apparatus of claim 1, wherein the first fluid deflector is secured to the inner surface of the water/wastewater filtration tank with a fastener.

7. The water/wastewater treatment apparatus of claim 1, wherein the first fluid deflector is secured to the inner surface of the water/wastewater filtration tank with an adhesive.

8. The water/wastewater treatment apparatus of claim 1, further comprising a sealant positioned between the back plate and to the inner surface of the water/wastewater filtration tank.

9. The water/wastewater treatment apparatus of claim 1, wherein the flange includes a bottom flange portion and an upper flange portion spaced-apart from and generally parallel to the bottom flange portion to define a passageway therebetween.

10. The water/wastewater treatment apparatus of claim 9, wherein the flange further includes an end wall coupled to and extending between the upper flange portion and the lower flange portion.

11. The water/wastewater treatment apparatus of claim 10, wherein the lower flange portion is coupled to the back plate and the upper flange portion is spaced-apart from the back plate.

12. The water/wastewater treatment apparatus of claim 1, further comprising a pipe positioned within the water/wastewater filtration tank, wherein:
    the flange of the first fluid deflector has an aperture therein, and
    the pipe extends through the aperture of the flange.

13. A water/wastewater treatment apparatus comprising:
    a water/wastewater filtration tank having an inner surface,
    a pipe positioned within the water/wastewater filtration tank,
    filter media contained within the water/wastewater filtration tank,
    a first fluid deflector including (i) a flange, and (ii) a back plate secured to the inner surface of the water/wastewater tank, the back plate including an upper portion positioned generally above the flange and a lower portion positioned generally below the flange, the flange extending outwardly and downwardly from the back plate, and
    a second fluid deflector having (i) a back plate coupled to an outer surface of the pipe, and (ii) a flange extending outwardly from the back plate,
    wherein (i) the flanges are positioned within the filter media such that the filter media surrounds the flanges, and (ii) the filter media includes at least one of sand and gravel.

* * * * *